(12) United States Patent
Peleg et al.

(10) Patent No.: US 8,571,853 B2
(45) Date of Patent: Oct. 29, 2013

(54) METHOD AND SYSTEM FOR LAUGHTER DETECTION

(75) Inventors: Oren Peleg, Zikhron Ya'akov (IL); Moshe Wasserblat, Modiin (IL)

(73) Assignee: Nice Systems Ltd., Raanana (IL)

( * ) Notice: Subject to any disclaimer, the term of this patent is extended or adjusted under 35 U.S.C. 154(b) by 1004 days.

(21) Appl. No.: 11/673,581

(22) Filed: Feb. 11, 2007

(65) Prior Publication Data

US 2008/0195385 A1 Aug. 14, 2008

(51) Int. Cl.
| | |
|---|---|
| G10L 19/00 | (2013.01) |
| G10L 19/06 | (2013.01) |
| G10L 21/00 | (2013.01) |
| G10L 25/93 | (2013.01) |

(52) U.S. Cl.
USPC .......... 704/208; 704/207; 704/206; 704/205; 704/201

(58) Field of Classification Search
USPC ................................ 704/201–208
See application file for complete search history.

(56) References Cited

U.S. PATENT DOCUMENTS

| | | | |
|---|---|---|---|
| 4,145,715 A | 3/1979 | Clever | |
| 4,527,151 A | 7/1985 | Byrne | |
| 5,051,827 A | 9/1991 | Fairhurst | |
| 5,091,780 A | 2/1992 | Pomerleau | |
| 5,303,045 A | 4/1994 | Richards et al. | |
| 5,307,170 A | 4/1994 | Itsumi et al. | |
| 5,353,168 A | 10/1994 | Crick | |
| 5,404,170 A | 4/1995 | Keating | |
| 5,491,511 A | 2/1996 | Odle | |
| 5,519,446 A | 5/1996 | Lee | |
| 5,734,441 A | 3/1998 | Kondo et al. | |
| 5,742,349 A | 4/1998 | Choi et al. | |
| 5,751,346 A | 5/1998 | Dozier et al. | |
| 5,774,851 A * | 6/1998 | Miyashiba et al. | 704/252 |
| 5,790,096 A | 8/1998 | Hill, Jr. | |
| 5,796,439 A | 8/1998 | Hewett et al. | |
| 5,847,755 A | 12/1998 | Wixson et al. | |
| 5,895,453 A | 4/1999 | Cook et al. | |

(Continued)

FOREIGN PATENT DOCUMENTS

| | | | | |
|---|---|---|---|---|
| EP | 1298645 A1 * | 4/2003 | | G10L 17/00 |
| EP | 1770687 A1 * | 4/2007 | | G10L 17/00 |

(Continued)

OTHER PUBLICATIONS

L. Kennedy and D. Ellis "Laughter detection in meetings," NIST ICASSP 2004 Meeting Recognition Workshop Montreal, QC, Canada, 2004.*

(Continued)

*Primary Examiner* — Douglas Godbold
*Assistant Examiner* — Michael Ortiz Sanchez
(74) *Attorney, Agent, or Firm* — Soroker Agmon

(57) ABSTRACT

A method and apparatus for laughter detection. Laughter is detected through the presence of a sequence of at least a predetermined number such as three consecutive bursts, each burst comprising a voiced portion and an unvoiced portion. After detecting bursts, n-tuples such as triplets are detected, and a likelihood of each burst N-tuple to represent laughter is provided by comparison to predetermined thresholds. Finally, a total score is assigned to the signal based on the grades associated with the triplets and parameters such as the distance between the N-tuples, the total score representing the probability that the audio signal comprises a laughter episode. The method and apparatus preferably comprise a training step and module for determining the thresholds according to manually marked audio signals.

30 Claims, 7 Drawing Sheets

(56) References Cited

U.S. PATENT DOCUMENTS

| | | | |
|---|---|---|---|
| 5,920,338 A | 7/1999 | Katz | |
| 6,014,647 A | 1/2000 | Nizzar et al. | |
| 6,028,626 A | 2/2000 | Aviv et al. | |
| 6,029,130 A * | 2/2000 | Ariyoshi | 704/248 |
| 6,031,573 A | 2/2000 | MacCormack et al. | |
| 6,037,991 A | 3/2000 | Thro et al. | |
| 6,070,142 A | 5/2000 | McDonough et al. | |
| 6,081,606 A | 6/2000 | Hansen et al. | |
| 6,092,197 A | 7/2000 | Coueignoux | |
| 6,094,227 A | 7/2000 | Guimier | |
| 6,111,610 A | 8/2000 | Faroudja | |
| 6,134,530 A | 10/2000 | Bunting et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,212,178 B1 | 4/2001 | Beck | |
| 6,230,197 B1 | 5/2001 | Beck et al. | |
| 6,295,367 B1 | 9/2001 | Crabtree et al. | |
| 6,327,343 B1 | 12/2001 | Epstein et al. | |
| 6,330,025 B1 | 12/2001 | Arazi et al. | |
| 6,345,305 B1 | 2/2002 | Beck et al. | |
| 6,427,137 B2 | 7/2002 | Petrushin | |
| 6,549,613 B1 | 4/2003 | Dikmen | |
| 6,570,608 B1 | 5/2003 | Tserng | |
| 6,604,108 B1 | 8/2003 | Nitahara | |
| 6,628,835 B1 | 9/2003 | Brill et al. | |
| 6,704,409 B1 | 3/2004 | Dilip et al. | |
| 6,807,525 B1 * | 10/2004 | Li et al. | 704/215 |
| 7,076,427 B2 | 7/2006 | Scarano et al. | |
| 7,103,806 B1 | 9/2006 | Horvitz | |
| 7,222,075 B2 * | 5/2007 | Petrushin | 704/270 |
| 2001/0052081 A1 | 12/2001 | McKibben et al. | |
| 2002/0005898 A1 | 1/2002 | Kawada et al. | |
| 2002/0010705 A1 | 1/2002 | Park et al. | |
| 2002/0059283 A1 | 5/2002 | Shapiro et al. | |
| 2002/0087385 A1 | 7/2002 | Vincent | |
| 2003/0033145 A1 * | 2/2003 | Petrushin | 704/236 |
| 2003/0055654 A1 * | 3/2003 | Oudeyer | 704/275 |
| 2003/0059016 A1 | 3/2003 | Lieberman et al. | |
| 2003/0154072 A1 * | 8/2003 | Young et al. | 704/9 |
| 2003/0163360 A1 | 8/2003 | Galvin | |
| 2003/0221630 A1 * | 12/2003 | Suzuki | 119/174 |
| 2004/0098295 A1 | 5/2004 | Sarlay et al. | |
| 2004/0141508 A1 | 7/2004 | Schoeneberger et al. | |
| 2004/0161133 A1 | 8/2004 | Elazar et al. | |
| 2004/0249650 A1 | 12/2004 | Freedman et al. | |
| 2005/0102135 A1 * | 5/2005 | Goronzy et al. | 704/213 |
| 2006/0093135 A1 | 5/2006 | Fiatal et al. | |
| 2006/0212295 A1 * | 9/2006 | Wasserblat et al. | 704/252 |
| 2007/0071206 A1 * | 3/2007 | Gainsboro et al. | 379/168 |
| 2007/0213981 A1 * | 9/2007 | Meyerhoff et al. | 704/243 |
| 2008/0162119 A1 * | 7/2008 | Lenhardt | 704/200.1 |
| 2009/0195392 A1 * | 8/2009 | Zalewski | 340/573.1 |

FOREIGN PATENT DOCUMENTS

| | | |
|---|---|---|
| WO | WO 95 29470 A | 11/1995 |
| WO | WO 98 01838 A | 1/1998 |
| WO | WO 00/73996 | 12/2000 |
| WO | WO 02/37856 | 5/2002 |
| WO | WO 03 013113 A2 | 2/2003 |
| WO | WO 03 067360 A2 | 8/2003 |
| WO | WO 03 067884 A1 | 8/2003 |

OTHER PUBLICATIONS

Truong, Khiet P. / Leeuwen, David A. van (2005): "Automatic detection of laughter", in INTERSPEECH-2005, 485-488.*

Ruch, W., and Ekman, P. (2001). "The expressive pattern of laughter," in Emotion, Qualia, and Consciousness, edited by A. W. Kaszniak (World Scientific, Tokyo), pp. 426-443.*

Lukic, B. (2003) Activity Detection in Public Spaces, M.Sc. Thesis, Royal Institute of Technology, Stockholm, Sweden.*

Rui Cai; Lie Lu; Hong-Jiang Zhang; Lian-Hong Cai; , "Highlight sound effects detection in audio stream," Multimedia and Expo, 2003. ICME '03. Proceedings. 2003 International Conference on , vol. 3, no., pp. III—37-40 vol. 3, Jul. 6-9, 2003.*

Ito, A.; Xinyue Wang; Suzuki, M.; Makino, S., "Smile and laughter recognition using speech processing and face recognition from conversation video," Cyberworlds, 2005. International Conference on , vol., no., pp. 8 pp. 444, Nov. 23-25, 2005.*

NiceVision—Secure your Vision, a prospect by NICE Systems, Ltd.

NICE Systems announces New Aviation Security Initiative, reprinted from Security Technology & Design.

(Hebrew) "the Camera That Never Sleeps" from Yediot Aharonot.

Freedman, I. Closing the Contact Center Quality Loop with Customer Experience Management, Customer Interaction Solutions, vol. 19, No. 9, Mar. 2001.

PR Newswire, Nice Redefines Customer Interactions with Launch of Customer Experience Management, Jun. 13, 2000.

PR Newswire, Recognition Systems and Hyperion to Provide Closed Loop CRM Analytic Applications, Nov. 17, 1999.

Financial companies want to turn regulatory burden into competitive advantage, Feb. 24, 2003, printed from Information Week, http://www.informationweek.com/story/IWK20030223S0002.

SEDOR—Internet pp. form http://www.dallmeier-electronic.com.

(Hebrew) print from Haaretz, "The Computer at the Other End of the Line", Feb. 17, 2002.

article SERTAINTY—Automated Quality Monitoring—SER Solutions, Inc.—21680 Ridgetop Circle Dulles, VA—WWW.ser.com.

article SERTAINTY—Agent Performance Optimization—2005 SE Solutions, Inc.

Lawrence P. Mark SER—White Paper—Sertainty Quality Assurance—2003-2005 SER Solutions Inc.

Robust Text Independent Speaker Identification Using Gaussian Mixture Speaker Models.

Douglas A. Reynolds Robust Text Independent Speaker Identification Using Gaussian Mixture Speaker Models—IEEE Transactions on Speech and Audio Processing, vol. 3, No. 1, Jan. 1995.

Chaudhari, Navratil, Ramaswamy, and Maes Very Large Population Text—Independent Speaker Identification Using Transformation Enhanced Multi-Grained Models—Upendra V. Chaudhari, Jiri Navratil, Ganesh N. Ramaswamy, and Stephane H. Maes—IBM T.j. Watson Research Centre—Oct. 2000.

Douglas A. Reynolds, Thomas F. Quatieri, Robert B. Dunn Speaker Verification Using Adapted Gaussian Mixture Models—Oct. 1, 2000.

Yaniv Zigel and Moshe Wasserblat—How to deal with multiple-targets in speaker identification systems?.

A tutorial on text-independent speaker verification—Frederic Bimbot, Jean Bonastre, Corinn Fredouille, Guillaume Gravier, Ivan Chagnolleau, Sylvian Meigner, Teva Merlin, Javier Ortega Garcia, Dijana Deacretaz, Douglas Reynolds—Aug. 8, 2003.

Towards an Automatic Classification of Emotions in Speech—N. Amir. S. Ron.

* cited by examiner

METHOD AND SYSTEM FOR LAUGHTER DETECTION

BACKGROUND OF THE INVENTION

1. Field of the Invention

The present invention relates to laughter detection in general, and more specifically to a method and system for detecting laughter in contact center interactions.

2. Discussion of the Related Art

Laughter detection is an important aspect of emotion detection which is part of audio analysis. Audio analysis refers to the extraction of information and meaning from audio signals for purposes such as statistics, agent evaluation, quality assurance, and the like. Audio analysis could be performed in audio interaction-extensive working environments, such as for example contact centers, financial institutions, health organizations, public safety organizations or the like, in order to extract useful information associated with or embedded within captured or recorded audio signals carrying interactions, such as phone conversations, interactions captured from voice over IP lines, microphones or the like. Audio interactions contain valuable information that can provide enterprises with insights into their users, customers, activities, business and the like. Identifying emotions in general and positive emotions in particular may provide important insight into the conduct of an agent, and the progress of interactions. Detecting laughter can assess the detection of emotions in general and positive emotions in particular in an interaction, and can provide such detection if other means failed to do so. Laughter detection can be used for example for proposes such as agent training or agent reward and compensation. Laughter detection should be speaker independent, and should not rely on having voice characteristics of the speakers in general, and the external party of the call in particular.

There is therefore a need for a system and method that would detect laughter with high degree of certainty, and would be fast and efficient, provide results in real-time or near-real time, and account for different environments, languages, cultures, speakers and other differentiating factors.

SUMMARY OF THE PRESENT INVENTION

It is an object of the present invention to provide a novel method and apparatus for detecting laughter episodes in audio signals, which overcome the disadvantages of the prior art.

In accordance with the present invention, there is thus provided a method for detecting one or more laughter episodes in an audio signal, the method comprising the steps of: detecting one or more bursts in the audio signal; detecting at least predetermined number of consecutive bursts; extracting one or more features from the consecutive bursts; determining whether one or more of the features comply with one or more predetermined thresholds; and if the features comply with the predetermined thresholds, outputting the consecutive bursts as a laughter episode. Within the method, the each burst optionally comprises a voiced segment followed by an unvoiced segment or a voiced segment followed by a silent segment. The method optionally comprises a preprocessing step for enhancing the audio signal for further processing. Within the method, the threshold is optionally associated with one or more scores, said scores assigned to the consecutive bursts. Within the method, the detection of the bursts optionally comprises the steps of: dividing the audio signal into frames; detecting for each of said frames whether it is voiced, unvoiced, or silent; determining one or more voiced sections comprising voiced frames and one or more unvoiced sections comprising unvoiced frames or one or more silent sections comprising silent frames; and detecting a burst as a voiced section followed by an unvoiced section or a silent section. Each frame optionally comprises between about 20 samples and about 2000 samples. The method optionally comprises a training step for determining the predetermined thresholds. The training step comprises the steps of: detecting one or more bursts in the audio signal; detecting at least predetermined number of consecutive bursts, associated with one or more parts of the audio signal; extracting one or more features from the parts of the audio signal; receiving one or more manually marked laughter episodes; and determining one or more thresholds, so that the features comply with the thresholds, if the parts of the audio signal at least partly overlap with the manually marked episodes. The method can further comprise a performance measurement step for measuring the performance of the method associated with the thresholds. Within the method, the featured are any of the group consisting of: mean voiced length; mean duty cycle; mean energy ratio; Mean distance between voiced sections; or an itakura distance. The method can further comprise a step of capturing the audio signals. The method optionally comprises step of interaction analysis of the audio signal, or a step of quality evaluation for the audio signal. Within the method, the quality evaluation step relates to an entity selected from the group consisting of: agent evaluation; interaction evaluation; product evaluation; sale evaluation; or service evaluation. The method is optionally performed as part of an agent training. The audio signal is captured from any of the group consisting of: a telephone; a voice over IP device; a microphone; or an audio part of a video capturing.

Another aspect of the disclosed invention relates to an apparatus for detecting one or more laughter episodes in an audio signal, the apparatus comprising: a burst detection component for detecting one or more bursts in the audio signal; a burst N-tuple detection component for detecting at least predetermined number of consecutive bursts; a burst N-tuple feature extraction component for extracting one or more features from the consecutive bursts; a scoring component for scoring the features against one or more predetermined thresholds; and a decision component for determining whether the features are associated with a laughter episode, according to whether the features comply with the predetermined threshold. The apparatus can further comprise a total scoring component for assigning a total score to the audio signal. The apparatus optionally comprises: a threshold set adjustment component for determining the predetermined threshold, and a performance measurement component for evaluating the predetermined thresholds. The apparatus can further comprise a manual marking component for marking one or more laughter episodes in an audio signal. The apparatus can further comprise a quality monitoring component for receiving a laughter episode indication for quality monitoring purposes. The\monitoring purposes are selected from the group consisting of: agent monitoring; interaction monitoring; product monitoring; sale monitoring, or service monitoring. The apparatus optionally comprises an interaction analysis component for receiving a laughter episode indication and analyzing an interaction associated with the audio signal.

Yet another aspect of the disclosed invention relates to a computer readable storage medium containing a set of instructions for a general purpose computer, the set of instructions comprising: detecting one or more bursts in an audio signal; detecting one or more predetermined number of consecutive bursts; extracting one or more features from the consecutive bursts; determining whether the features to comply with one or more predetermined threshold; and if the features comply with the predetermined thresholds, outputting the predetermined number of consecutive bursts as a laughter episode.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

The present invention overcomes the disadvantages of the prior art by providing a novel method and a system for automatically detecting laughter in an interaction containing a vocal part, captured in a contact center.

The disclosed invention presents an effective and efficient laughter detection method and apparatus in audio interactions. The method is based on detecting laughter episodes, comprising of at least a minimal predetermined number of consecutive bursts, wherein each burst is composed of a voice portion immediately, or close to immediately, followed by an unvoiced or silent portion. Once a sequence of bursts is identified, laughter characteristic features are determined for the sequence, and are compared against one or more predetermined sets of criteria. If the features meet any of the criteria sets, a predetermined laughter certainty score is attached to the relevant part of the interaction. The invention further comprises a training module and step, for determining the criteria sets against which the features of the detected sequences are compared, and the associated scores assigned to the burst sequences, representing the probability that the sequences are a part of a laughter episode.

Figure 1:
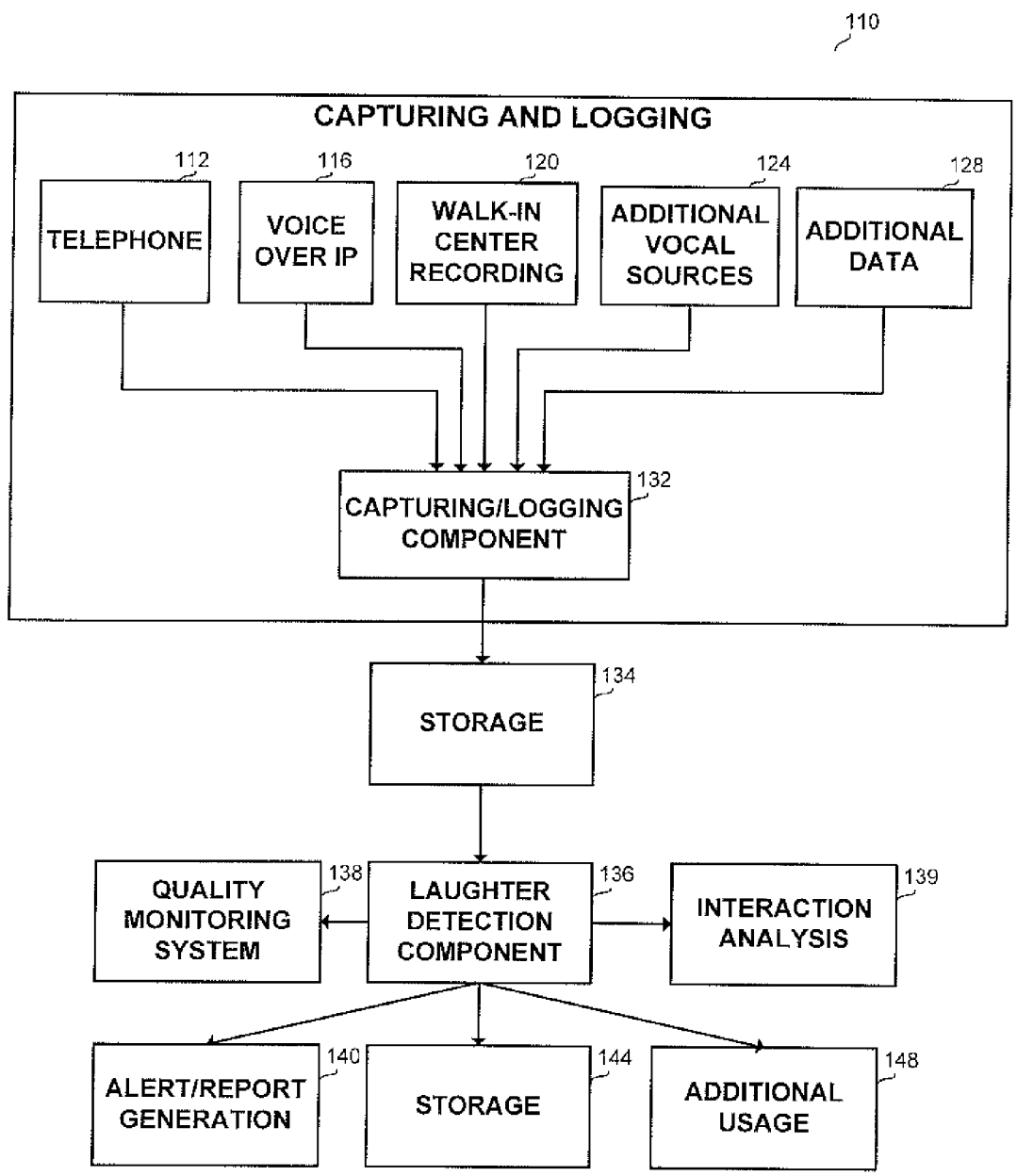
FIG. 1 is a block diagram of a typical environment in which the present invention is used.

Referring now to FIG. 1, which presents a block diagram of the main components in a typical environment in which the disclosed invention is used. The environment, generally referenced as 110, is an audio-interaction-rich organization, typically a call center, a bank, a trading floor, another financial institute, a public safety contact center, or the like. Customers, users, or other contacts are contacting the center, thus generating input information of various types. The information types include vocal interactions, non-vocal interactions and additional data. The capturing of voice interactions can employ many forms and technologies, including trunk side, extension side, summed audio, separated audio, various encoding methods such as G729, G726, G723.1, and the like. The vocal interactions usually include telephone 112, which is currently the main channel for communicating with users in many organizations. The voice typically passes through a PABX (not shown) which in addition to the voices of the two or more sides participating in the interaction collects additional information discussed below. A typical environment can further comprise voice over IP channels 116, which possibly pass through a voice over IP server (not shown). The interactions can further include face-to-face interactions, such as those recorded in a walk-in-center 20, and additional sources of vocal data 124, such as microphone, intercom, the audio part of video capturing, vocal input by external systems or any other source. In addition, the environment comprises additional non-vocal data of various types 128, such as Computer Telephony Integration (CTI) used in capturing the telephone calls, data from external sources such as billing, CRM, screen events, or the like. The data can include links to additional interactions in which one of the speakers in the current interaction participated. Data from all the above-mentioned sources and others is captured and preferably logged by capturing/logging unit 132. The captured data is stored in storage 134, which is preferably a mass storage device, for example an optical storage device such as a CD, a DVD, or a laser disk; a magnetic storage device such as a tape or a hard disk; a semiconductor storage device such as Flash, RAM, USB device, or the like. The storage can be common or separate for different types of captured interactions and different types of additional data. The storage can be collocated with the contact site or the capturing site. Alternatively, the storage can be remote from the contact and the capturing site and can serve one or more sites of a multi-site organization such as a bank. Capturing/logging unit 132 comprises a computing platform running one or more computer applications as is detailed below. From capturing/logging unit 132, the vocal data and preferably the additional relevant data are transferred to laughter detection component 136 which detects laughter in an audio interaction. If the audio content of all or some of the interactions is recorded as summed, then speaker segmentation has to be performed prior to detecting laughter within the recording. Details about the detected laughter segments are preferably transferred to alert/report generation component 140. Component 140 preferably generates, updates or sends a report related to the interaction, the calling party, the called party and other details to a user, such as a supervisor, a compliance officer or the like. The output of laughter detection component 136 can serve as input to quality monitoring component or system 138, which receives an indication of a laughter episode and evaluates or monitors the quality of any entity in the organization, including interactions, agents, products, services, or the like. A laughter indication can be an indication to a successful interaction, customer satisfaction, positive emotion, an agent performing well, or alternatively an unhappy customer or other unwanted events if the laughter is cynical. The evaluation can be done as a part of agent training or agent ongoing evaluation. The output of component 136 can further be used by interaction analysis component or system 139, for receiving laughter episode indications, and classifying, retrieving data from, and otherwise analyzing interactions associated with the signal. The interactions may be vocal, such as a telephone interaction, or at least comprise a vocal component such as a video conference. The information can further be transferred for storage purposes 144. In addition, the information can be transferred to any other purpose or component 148, such as playback, in which the laughter segments are marked so that a user can skip directly to these segments instead of listening to the whole interaction. All components of the system, including capturing/logging components 132 and laughter detection component 136, preferably comprise one or more computing platforms, such as a personal computer, a mainframe computer, or any other type of computing platform that is provisioned with a memory device (not shown), a CPU or microprocessor device, and several I/O ports (not shown). Alternatively, each component can be a DSP chip, an ASIC device storing the commands and data necessary to execute the methods of the present invention, or the like. Each component can further include a storage device (not shown), storing the relevant applications and data required for processing. Each component of each application running on each computing platform, such as the capturing applications or the laughter detection application is a set of logically inter-related computer programs, modules, or libraries and associated data structures that interact to perform one or more specific tasks. The computer programs can be written in any programming language, such as C, C++, C#, Java or the like, and under any development environment. All components of the applications can be co-located and run on the same one or more computing platform, or on different platforms. In yet another alternative, the information sources and capturing platforms can be located on each site of a multi-site organization, and one or more laughter detection components can be possibly remotely located, processing interactions captured at one or more sites and storing the results in a local, central, distributed or any other storage. In another preferred alternative, the laughter detection application can be implemented as a web service, wherein the detection is performed by a third-party server, and accessed through the internet by clients supplying audio recordings. Any other combination of components, either as a standalone apparatus, an apparatus integrated with an environment, a client-server implementation, or the like, which is currently known or that will become known in the future can be employed to perform the objects of the disclosed invention.

Figure 2:
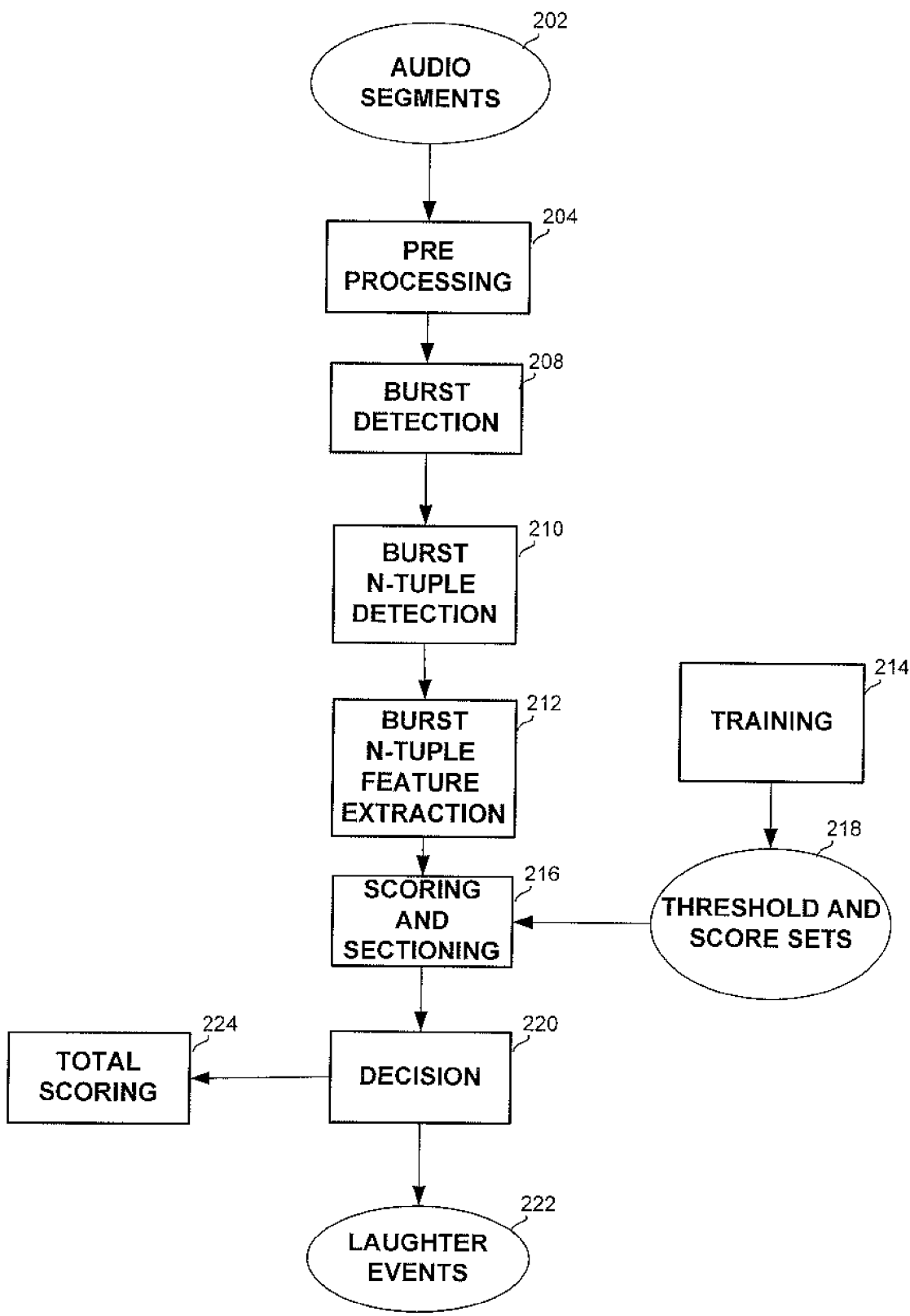
FIG. 2 is a flowchart of the main steps of laughter detection, in accordance with a preferred embodiment of the disclosed invention.

Referring now to FIG. 2, showing a flowchart of the main steps in detecting laughter events within an audio interaction. The laughter detection method operates on audio segments 202, which may be recorded as trunk side, extension side, summed audio, separated audio, various encoding methods such as G729, G726, G723.1, or the like. The first step is pre processing step 204, which performs initial actions, required for enhancing or preparing the vocal interaction for further processing. The preprocess may include any one or more of the following tasks: separating a summed audio signal, filtering the speech signal from DC components, uncompressing compressed signals, removing silent or low quality segments of the signal, or the like. At step 208, bursts comprised of consecutive voiced frames immediately followed by consecutive unvoiced or silent segments are detected. The bursts are formed by initial classification of the speech signal. Step 208 is further detailed in association with FIG. 3 below. At step 210 consecutive burst N-tuples are detected, wherein each burst N-tuple consists of at least a predetermined number of consecutive bursts, forming together a candidate for a laughter episode. The predetermined number of consecutive bursts used is usually three, but can vary without departing from the spirit of the current invention. In a candidate to a laughter episode comprised for example of four bursts, two partly overlapping series of three bursts are detected. At step 212, features relevant to laughter detection are extracted from series of bursts detected at step 210 and at step 216 the feature vectors for each series are scored in comparison to predetermined thresholds and score sets 218. Thresholds and score sets 218 are determined in training step 214, detailed in association with FIGS. 5 and 6 below. In step 220 a decision is taken whether to accept or reject the consecutive bursts as a laughter episode, by comparing its score to a predetermined threshold. The laughter episodes 222 are output as detailed in association with FIG. 1 above. Steps 216, 218 and 220 are further detailed below. Optionally, after decision step 220, a total scoring step 224 step is performed, for providing a total score to the audio signal, based for example on the number and distance between multiple laughter episodes detected in the segment, the scores of the laughter episodes, the length of the signal or other parameters.

Figure 3:
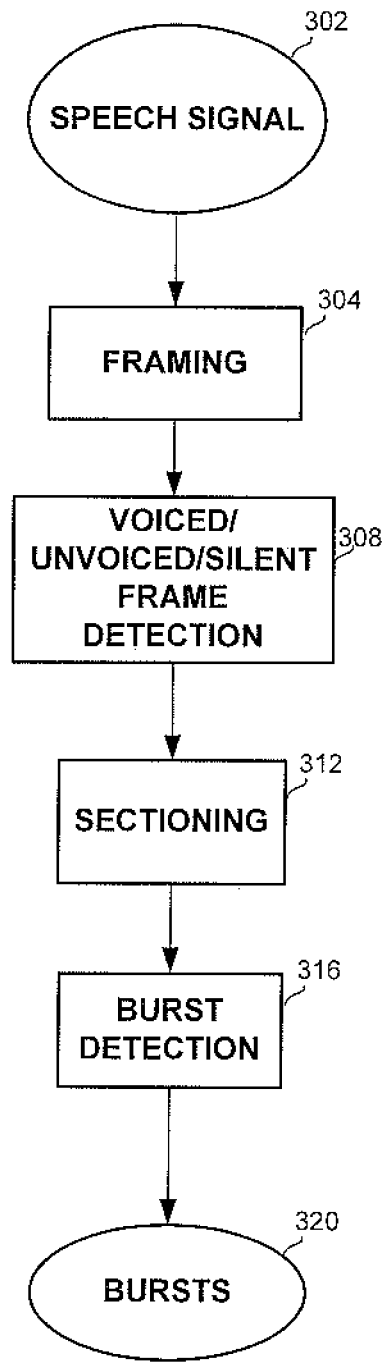
FIG. 3 is a flowchart of the main steps in detecting a laughter burst, in accordance with a preferred embodiment of the disclosed invention.
Figure 4:
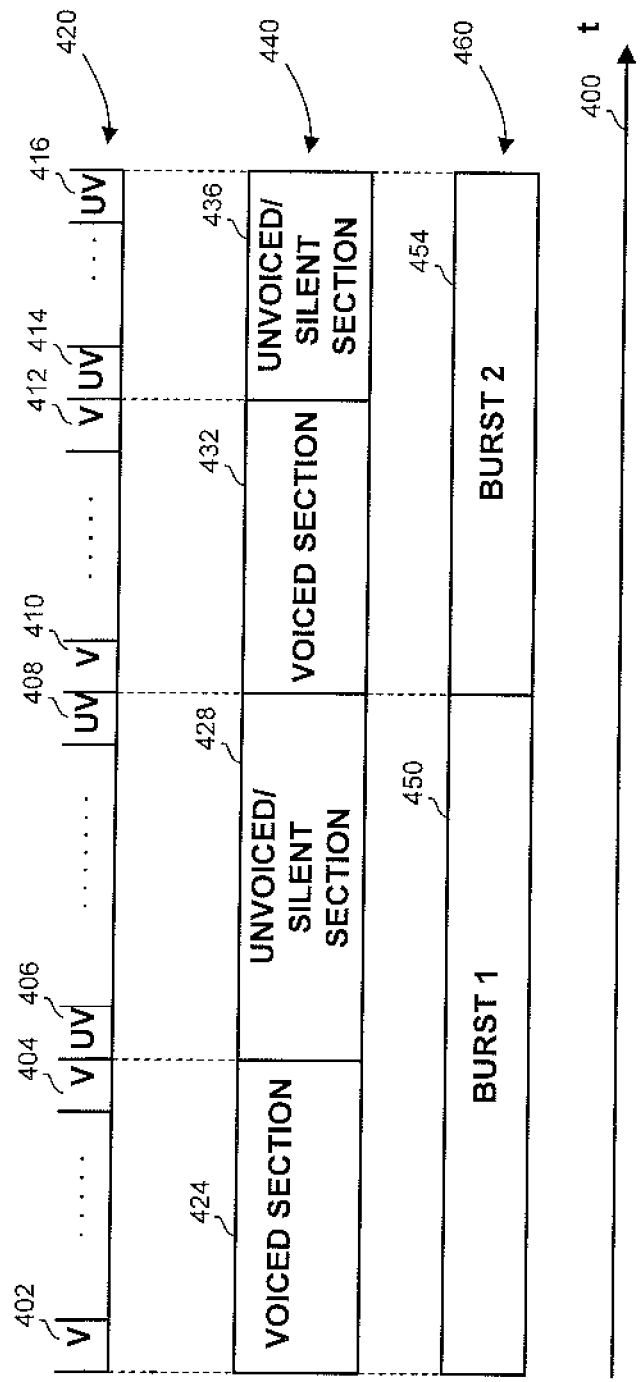
FIG. 4 is an illustration of a laughter episode, in accordance with a preferred embodiment of the disclosed invention.

Referring now to FIG. 3, detailing burst detection step 208 of FIG. 2 and to FIG. 4 which shows a schematic illustration of laughter bursts. In framing step 304 input speech signal 302 is divided into non-overlapping frames, wherein each frame typically comprises 128 samples, but any other predetermined number of samples, such as between about 20 samples and about 2000 samples can be used. Typically, the audio signal is sampled in a rate of about 8000 frames per second. Each frame should contain enough samples so that the number of zero crossings will be meaningful, but not too many samples, so that voiced or unvoiced sections will be missed. Speech phonemes are generally divided into two types: voiced and unvoiced phonemes. Voiced phonemes are produced when air flows through the vocal chords and the vocal tract. The vocal cords vibrate periodically thus creating periodic excitation. Unvoiced phonemes are produced by the friction between the inhaled or exhaled air and the vocal tract wherein the vocal cords do not vibrate, i.e. random (white-noise-like) excitation. Detection of unvoiced frames is optionally based on counting the number of zero crossings of the time domain signal, i.e. the number of times the signal's amplitude changes sign and crosses the zero line. Generally, periodical signals, which are typical of voiced phonemes yield less zero crossings per frame than uncorrelated white-noise-like signals (unvoiced). At voiced/unvoiced/silent frame detection step 308, each frame is classified to be voiced, unvoiced or silent. The differentiation between silent frames and non-silent frames is performed according to the energy level of the signal, and the differentiation between voiced and invoiced frames is done according to the number of zero crossings occurring within the samples of the frame. The frames are shown in series 420 of FIG. 4, wherein frames 402, 404 and all frames occurring between them, 410, 412 and all frames occurring between them are voiced frames and frames 406, 408 and all frames occurring between them, and frames 414, 416 and all frames occurring between them are unvoiced or silent frames. A typical voiced frame of 128 samples, wherein the voice is sampled 8000 times a second, typically contains between about 1 and about 10 zero crossings. An unvoiced frame sampled at the same rate typically contains between about 20 and about 100 zero crossings. At step 312 of FIG. 3 the frames are divided into sections, wherein the frames within each section are either all voiced or all unvoiced. Consecutive voiced frames bounded by unvoiced or silent frames constitute a voiced section while consecutive unvoiced or silent frames bounded by voiced frames constitute an unvoiced or silent section. Series 440 of FIG. 4 shows the division of the frames of row 420 into sections. Sections 424 and 432 are voiced while sections 428 and 436 are unvoiced or silence. At step 316 a burst is detected by a voiced section followed by an unvoiced or silent section. Each burst extends from the beginning of a voiced section to the beginning of the following voiced section. Thus, series 460 of FIG. 4 shows burst 1 (450) comprising voiced section 424 and unvoiced section 428, and burst 2 (454) comprising voiced section 432 and unvoiced section 436. The bursts are checked for validity, by applying a number of validity criteria, and each burst that does not meet the validity criteria is discarded. The burst validity criteria include, but are not limited to assuring a minimal burst length of about 50 mSec. The bursts that meet the validity criteria are output as bursts 320 of FIG. 3.

Referring now back to FIG. 2. Burst N-tuple detection step 210 of FIG. 2 provided the input to the next steps of laughter detection, which is one or more N-tuples of bursts, typically a triplet of bursts, although other numbers can be used as well. Each series of three consecutive bursts are bounded as triplets, and the triplets are overlapping such that each triplet has between zero and two overlapping bursts with its neighboring triplets, if any. In the case of burst triplet, laughter that is shorter than four bursts (2 consecutive triplets) will not be detected. At step 212 of FIG. 2, a vector feature is determined for each triplet. The components are preferably determined based on statistics measures for the bursts belonging to the triplet. The triplet feature vector preferably includes one or more of the following features, but may also include others: 1. Mean voiced length: The voiced length of each burst in the triplet is determined and the mean voiced length of the triplet is determined to be the average of the voiced lengths. 2. Mean duty cycle: duty cycle is defined as the relative length of the voiced section of the burst in relation to the total length of the burst. The duty cycle is determined for each burst in the triplet and the mean duty cycle is the average for the triplet. 3. Mean energy ratio: Energy ratio is defined as the ratio between the energy level of the voiced section of the burst and the energy level of the unvoiced section of the burst. The triplet mean energy ratio is determined by the mean energy ratios of all three bursts of the triplet. 4. Mean distance between voiced sections: The distance between voiced sections is defined as the distance between the start of voiced section of the burst and the start of voiced section of following burst. The triplet mean distance between voiced is the mean value of the distance between the start of the voiced sections of the first and the second bursts, and the distance between the start of the voiced sections of the second and the third bursts within the triplet. 5. Mean Itakura distance: Two Itakura distances are calculated for each triplet: (i) Itakura distance between the first and second burst, (ii) Itakura distance between the second and third burst. The Mean Itakura Distance for a triplet is the average between those two distances. For x and y being two series of time domain speech samples, an Itakura distance d(x, y) is defined as a distance measure between the two speech sample series:

$$d(x, y) = \log\left(\frac{\vec{a}_y^T R_{xx} \vec{a}_y}{\vec{a}_x^T R_{xx} \vec{a}_x}\right)$$

wherein $\vec{\alpha}_x$ and $\vec{\alpha}_y$ are the Linear Prediction (LP) parameters of signals x, y respectively, $R_{xx}$ is the autocorrelation matrix of x, and P, being the order of the linear prediction is typically between about 5 and about 50:

$$R_{xx} = \text{toeplitz}(\vec{R}_x) = \begin{bmatrix} R[0] & R[1] & \cdots & R[P] \\ R[1] & R[0] & & \\ \vdots & & \ddots & \\ & & R[0] & R[1] \\ R[P] & R[P-1] & \cdots & R[1] & R[0] \end{bmatrix}$$

$$\vec{a} = [1 \quad -a_1 \quad -a_2 \quad \cdots \quad -a_P]^T$$

Once all features for all burst N-tuples are determined, scoring and sectioning step 216 of FIG. 2 takes place. A laughter episode is constructed of at least a predetermined number of consecutive, i.e. partly overlapping burst N-tuples, for example, two triplets of bursts may be considered as a laughter episode. The feature vector of each triplet is compared against a predefined range/threshold set 218 in order to determine whether the burst N-tuple should be accepted or rejected as a candidate for laughter event. Alternatively, each triplet is compared against multiple range/threshold set 218, wherein the various sets preferably vary in their span or allowable values. Thus, a burst N-tuple may not be considered as a laughter candidate when compared against a first set defining relatively small ranges, but may be considered as such when compared against a more "relaxed" set allowing larger ranges. If the sets can be ordered from stricter to more relaxed, then once a burst N-tuple was accepted as a candidate for laughter event by comparison to a more strict set, there is no need to compare it to further sets. The strictest set that allows a burst N-tuple to be accepted as a laughter episode determines a baseline score for the burst N-tuple, representing the certainty that the burst N-tuple is indeed a part of a laughter event. Each score is preferably received with the range/threshold set 218. Thus, in a preferred embodiment of the disclosed invention, each burst N-tuple receives a score according to its feature vectors, the score reflecting the probability of the detected event to be a laughter event. The score is further enhanced by the number of consecutive burst N-tuples in the event. Thus, if two or more burst N-tuples were accepted as laughter events with a predetermined score, they are considered as a single laughter event with increased accuracy, which is regarded as a "length bonus". At step 220 of FIG. 2, it is determined based on the scores of the events whether they are to be output as laughter events.

Figure 5:
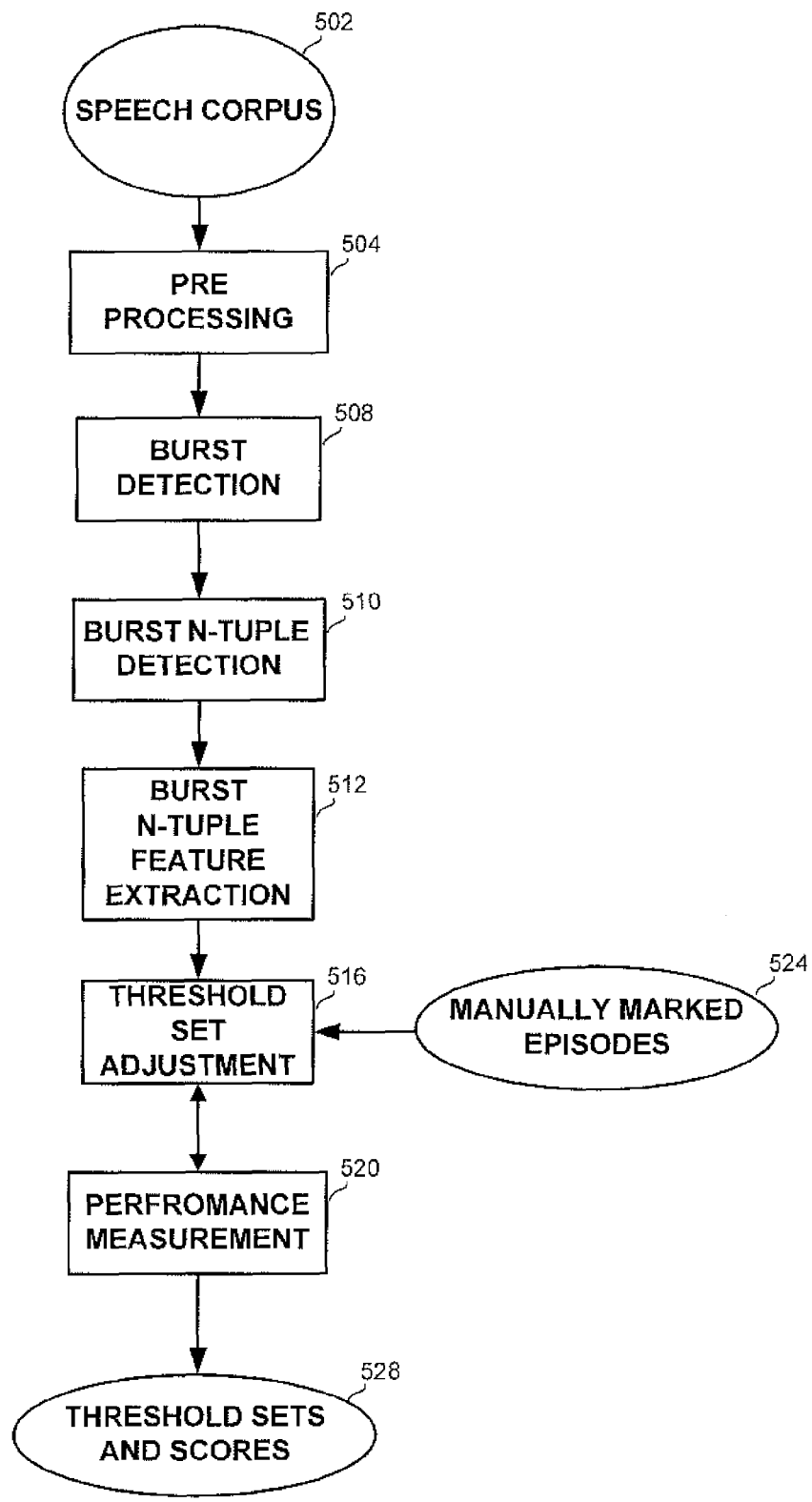
FIG. 5 is a flowchart of the main steps in the laughter detection training phase, in accordance with a preferred embodiment of the disclosed invention.
Figure 6A:
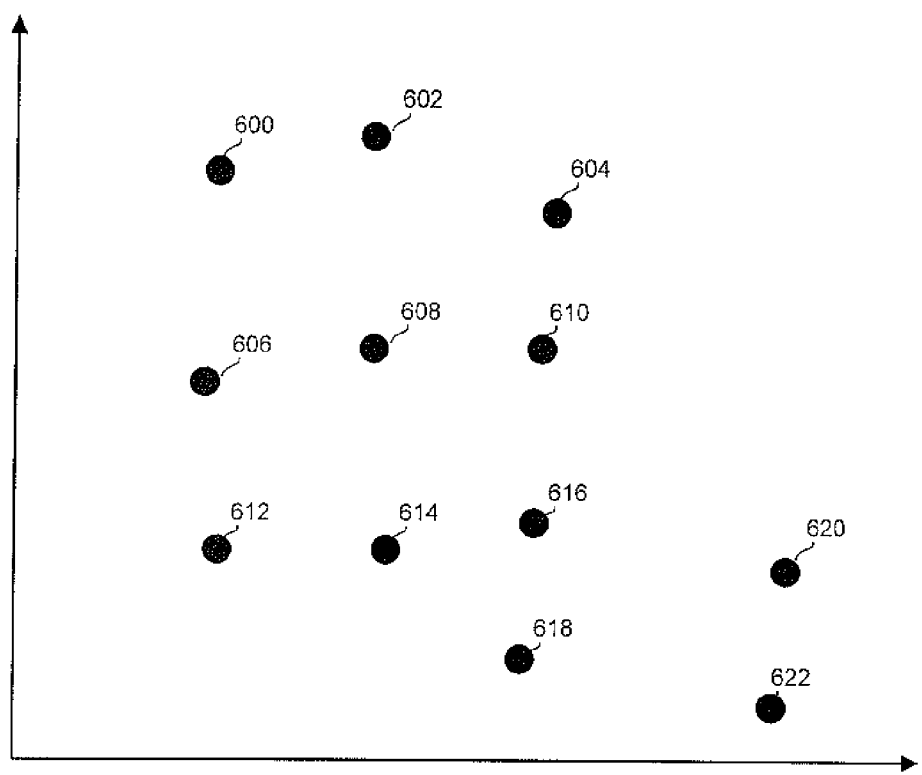
FIG. 6 shows a schematic graph of the threshold set adjustment step of the training phase.
Figure 6B:
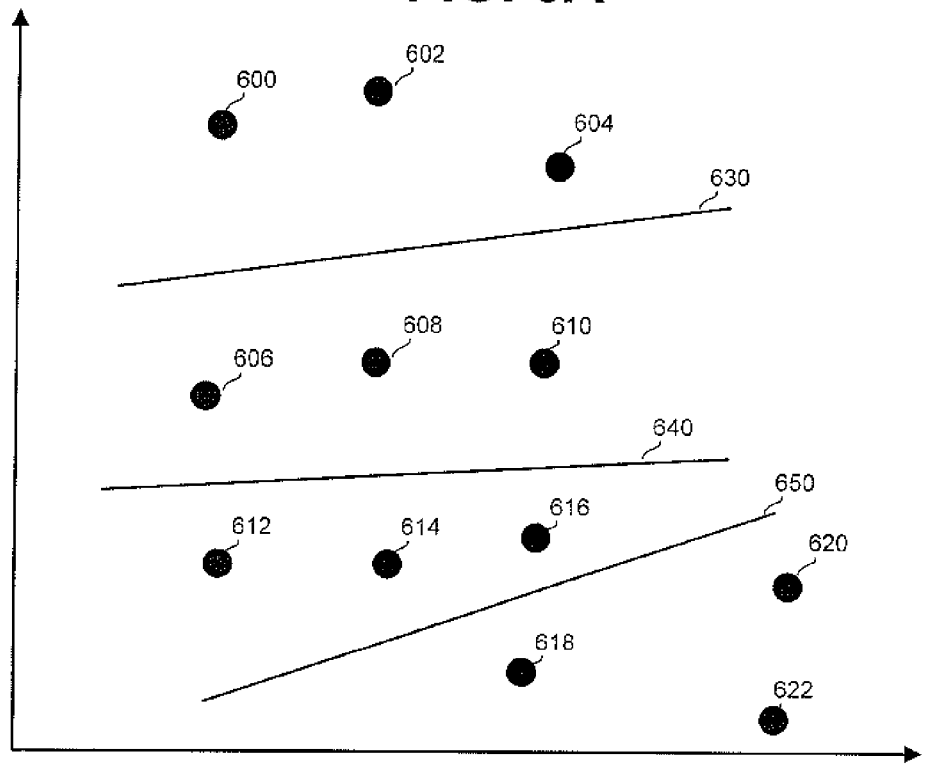

Referring now to FIG. 5, showing a flowchart of training step 214 of FIG. 2, used for setting the thresholds and scores 218 of FIG. 2. The input to the training method is speech corpus 502, which preferably comprises laughter episodes. The laughter episodes preferably represent laughter episodes expected in the environment, in terms of gender, age, phone equipment used or additional parameters. At step 504 preprocessing is performed, similarly to step 204 of FIG. 2. The preprocessing can include any one or more of the following: separating a summed audio signal, filtering the speech signal from DC components, uncompressing compressed signals, removing silent or low quality segments of the signal, or the like. At step 508 bursts are detected, similarly to step 208 of FIG. 2, detailed in FIG. 3. Burst N-tuple detection step 510 and burst N-tuple feature extraction step 512 are similar to burst N-tuple detection step 210 and burst N-tuple feature extraction step 212 are of FIG. 2, respectively. Threshold set adjustment 516 takes place once all items in speech corpus 502 passed steps 504, 508, 510 and 512, since threshold set adjustment step 516 works on a corpus rather than on a single audio segment. The accuracy and statistic significance of the results of threshold set adjustment step 516 increase as a larger speech corpus is used. The input to threshold set adjustment 516 is the feature vectors generated by burst N-tuple feature extraction step 512, together with their location indication, and manually marked episodes, together with their location indication 524, comprising location and score indication for each episode. The location indication can be the name of a file comprising the audio signal, and the start and end locations of a laughter episode in milliseconds from the beginning of the signal, or any other indication. The manually marked score for the laughter event represents the clarity that this part of the audio signal is indeed a laughter. The episodes are preferably marked by a human operator. However, when the step is recurrently performed, and when time for manually marking the episodes is a problem, an indication from the system using previous values can be a starting point for a human rather than listening to all signals, although this option provides sub-optimal results, since the user may miss episodes which were missed by the system, and will only be notified of the detected episodes, including the false alarms. At step 516, thresholds and scores are suggested to correlate between the feature vectors of the burst N-tuples detected in speech corpus 502 and manually marked episodes 524. Thus, thresholds and weights are suggested so that feature vectors which are associated with segments that received similar scores by the manual marking, comply with the same set of thresholds. The overlapping between the manually marked segments and the segments to which the feature vectors relate does not have to be full, but at least some overlapping is required. For clarity sake, consider FIG. 6A and FIG. 6B, showing a graphical representation of the threshold setting for the case of feature vectors having two elements, i.e. two features are evaluated for each burst N-tuple. FIG. 6A shows points 600, 602, 604, 606, 608, 610, 612, 614, 616, 618, 620, and 622 which represent two-dimensional feature vectors of 11 burst N-tuples identified as candidates for laughter episodes. Suppose that the manually marking indicated that the segments associated with points 600, 602 and 604 are laughter segments that should receive a high score, the segments associated with points 606, 608 and 610 are laughter segments that should receive a medium score, the segments associated with points 612, 614 and 616 are laughter segments that should receive a low score, and the segments associated with points 618, 620 and 622 are not laughter segments, and were not marked. Thus, the shareholding step should provide thresholds that tell apart as many of the feature vectors associated with each score. In the example of FIG. 6B, the linear thresholding identifies the parameters associated with lines 630, 640 and 650, so that points exceeding the thresholds associated with line 630 will be identified as laugh episodes and receive a high score, points that do not comply with the threshold of line 630 but do comply with the threshold of line 640 will be identified as laugh episodes having a medium score, and points that do not comply with the threshold of lines 630 and 640 but do comply with the threshold of line 650 will be identified as laugh episodes having a low score. Vectors that meet no thresholds are not detected as laughter episodes. It will be appreciated that the example shown in FIGS. 6A and 6B is for clarity sake only, since in a typical case more than two features will be evaluated for each burst N-tuple, and preferably more than nine laughter episodes will be marked. Further, the thresholds do not necessarily define straight lines, planes, or the like, and can comprise any function of the feature values. Thus, for a feature vector to comply with the threshold, it may be required that one or more elements of the feature vector are higher than one or more thresholds, that one or more elements of the feature vector are lower than one or more thresholds, that one or more elements of the feature vector are between two threshold values, or that one or more functions operated on one or more elements of the feature vector comply with one or more threshold values. It will also be appreciated that since the thresholding is a heuristic process, it is not always possible to provide such thresholds so that each point falls within the boundary of the threshold defined for the score associated with that segment. The classification is preferably performed with methods such as linear regression, or neural networks. At performance measurement step 520 the overall system performance is evaluated. The performance is measured using parameters like detection rate, i.e., the number of detected bursts out of the total number of bursts, and accuracy, i.e. the percentage of false alarms out of the total number of output episodes. If the results of performance measurement step 520 are not satisfactory, threshold set adjustment step 516 is repeated, possibly with manual changes to the identified thresholds. In a preferred embodiment, only part of the speech corpus is used for setting the threshold, while the rest of the corpus is used for testing the thresholds. The output of the training step is threshold sets and scores 528.

Figure 7:
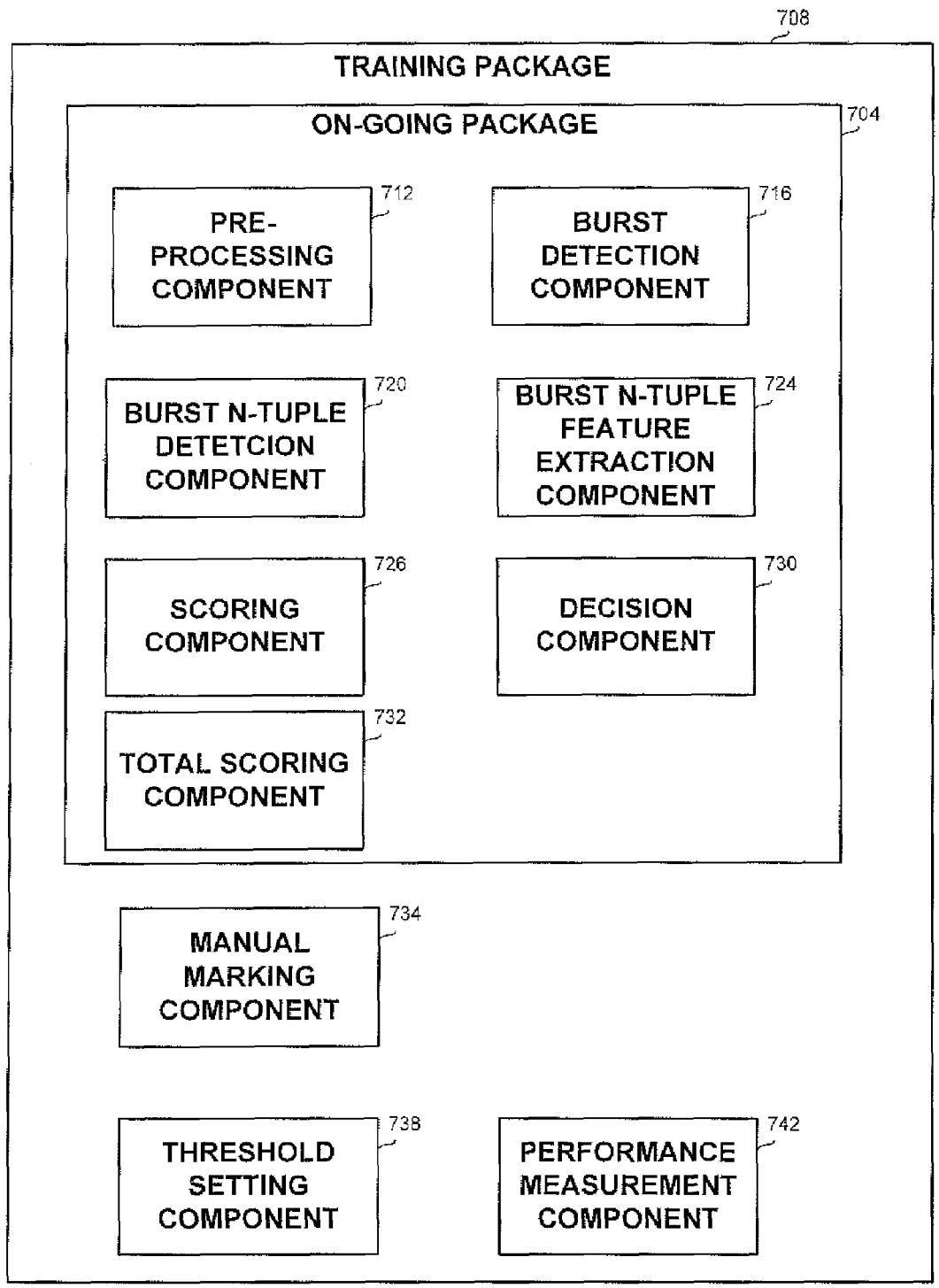
FIG. 7 is a block diagram of the main components in a preferred embodiment of the apparatus of the present invention.

Referring now to FIG. 7, showing a block diagram of the main components in a preferred embodiment of the apparatus of the present invention. The apparatus comprises on-going package 704, designed for receiving audio signals and outputting detected laughter episodes. The apparatus further comprises training package 708, which comprises all components of on-going package 704, and additional components required for performing the training method detailed in association with FIG. 5 above. The components of on-going package 704 comprise; pre-processing component 712, for performing the preprocessing detailed in association with step 204 above; burst detection component 716, designed for performing the burst detection method detailed in association with FIG. 3 above; burst N-tuple detection component 720 for performing burst N-tuple detection step 210 of FIG. 2; burst N-tuple feature extraction component 724 for extracting features from burst N-tuples as detailed for step 212 of FIG. 2; scoring component 726 for scoring the burst N-tuples against thresholds generated by the training as detailed in association with step 216 of FIG. 2 and decision component 730 for integrating the scores for the burst N-tuples and deciding about the detected laughter episodes and their associated scores. On-going package 704 optionally comprises total scoring component 732 for assigning a total score to the input signal, the total score related to the probability that the audio signal comprises one or more laughter episode. Training package 708 optionally comprises manual marking component 734, which enables a user to listen to audio segments, mark the beginning and end of laughter episodes and assign a score to each laughter. The marked segments are then used as manually marked episodes 524 for the training method. Training package 708 further comprise threshold setting component 738 for determining the thresholds and scores according to which scoring component 726 scores detected burst N-tuples, and performance measurement component 742 for measuring the performance of the system on a given corpus, in relation to a specific set of thresholds.

It will be appreciated by a person skilled in the art that the disclosed methods can be activated once an audio signal capturing and possibly storing steps were performed. Additional steps of quality monitoring for an interaction, or interaction analysis utilizing the results of the voice detection methods can be implemented as well. The environment can be a contact center, a financial institution, or any other location.

The disclosed invention provides a method and apparatus for laughter episodes detection in audio signals. Detecting laughter episodes can help assess positive emotions detected in an audio signal, or serve as a goal in itself, for rewarding personnel members of an organization for pleasant service, or generally getting more insight from vocal information captured in an organization. The method and apparatus detail a preferred implementation of the disclosed invention, but various modifications and variants can be implemented without departing from the spirit of the disclosed invention, and are included in the previous description.

It will be appreciated by persons skilled in the art that the present invention is not limited to what has been particularly shown and described hereinabove. Rather the scope of the present invention is defined only by the claims which follow.

The invention claimed is:

1. A method for detecting an at least one laughter episode in an audio signal of a telephone interaction in a call center, the method comprising the steps of:
   capturing an audio signal of a telephone interaction in a call center;
   detecting, an at least one burst in the audio signal;
   detecting, at least predetermined number of consecutive bursts as N-tuple;
   extracting in time domain an at least one time domain feature from the at least predetermined number of consecutive bursts, wherein the at least one time domain feature is selected from the group consisting of: mean duty cycle, mean distance between voiced sections, and an itakura distance;
   scoring the least one time domain feature against an at least one predetermined threshold;
   determining whether the at least one feature complies with the at least one predetermined threshold; and
   if the at least one time domain feature complies with the at least one predetermined threshold, determining whether the at least predetermined number of consecutive bursts represent a laughter episode.

2. The method of claim 1 wherein the at least one burst comprises a voiced segment followed by an unvoiced segment.

3. The method of claim 1 wherein the at least one burst comprises a voiced segment followed by a silent segment.

4. The method of claim 1 further comprising a preprocessing step that comprises one or more of: separating a summed audio signal, filtering a speech signal from DC components, uncompressing compressed signals, or removing silent or low quality segments of the audio signal.

5. The method of claim 4 wherein pre-processing comprises at least one item selected for the group consisting of: separating a summed audio signal, filtering the speech signal from DC components, uncompressing compressed signals, and removing silent or low quality segments of the signal.

6. The method of claim 1 wherein the at least one threshold is associated with an at least one score, said at least one score assigned to the at least predetermined number of consecutive bursts.

7. The method of claim 1 wherein the detection of the at least one burst comprises the steps of:
   dividing the audio signal into frames;
   detecting for each of the frames whether it is voiced, unvoiced, or silent;
   determining an at least one voiced section comprising voiced frames, and an at least one unvoiced section comprising unvoiced frames or an at least one silent section comprising silent frames; and
   detecting an at least one burst as one or more of the at least one voiced sections and a consecutive the at least one unvoiced sections, or the at least one voiced sections and a consecutive the at least one silent sections.

8. The method of claim 7 wherein each of the frames comprises between about 20 samples and about 2000 samples.

9. The method of claim 1 further comprising a training step for determining the at least one predetermined threshold.

10. The method of claim 9 wherein the training step comprises the steps of: detecting an at least one burst in the audio signal;
    detecting at least predetermined number of consecutive bursts, associated with an at least one part of the audio signal;
    extracting an at least one feature from the at least one part of the audio signal;
    receiving an at least one manually marked episode; and
    determining an at least one threshold, so that the at least one feature complies with the at least one threshold, if the at least one part of the audio signal at least partly overlaps with the at least one manually marked episode.

11. The method of claim 10 further comprising a performance measurement step for measuring the performance of the method associated with the at least one threshold.

12. The method of claim 1 wherein the at least one feature is a mean voiced length.

13. The method of claim 1 further comprising a step of capturing the audio signal.

14. The method of claim 1 further comprising performing interaction analysis of the audio signal in accordance with the score output for the audio signal.

15. The method of claim 1 further comprising a step of quality evaluation for the audio signal.

16. The method of claim 15 wherein the quality evaluation step relates to an entity selected from the group consisting of: agent evaluation; interaction evaluation; product evaluation; sale evaluation; or service evaluation.

17. The method of claim 1 when performed as part of an agent training.

18. The method of claim 1 wherein the audio signal is captured from any of the group consisting of: a telephone; a voice over IP device; a microphone; or an audio part of a video capturing.

19. The method of claim 1 further comprising assigning a total score indicating a probability that the audio signal comprises a laughter episode.

20. The method of claim 1 wherein the at least one predetermined threshold is a threshold set comprising at least two thresholds.

21. An apparatus for detecting an at least one laughter episode in an audio signal of a telephone interaction captured in a call center, the apparatus comprising:
    a burst detection component for detecting, an at least one burst in the audio signal;
    a burst N-tuple detection component for detecting, at least predetermined number of consecutive bursts;
    a burst N-tuple feature extraction component for extracting in time domain an at least one time domain feature from the at least predetermined number of consecutive bursts, wherein the at least one time domain feature is selected from the group consisting of: mean duty cycle, mean distance between voiced sections, and an itakura distance;
    a scoring component for scoring the least one time domain feature against an at least one predetermined threshold; and
    a decision component for determining whether the at least one time domain feature is associated with a laughter episode, according to whether the at least one time domain feature complies with the at least one predetermined threshold.

22. The method of claim 1 wherein the audio signal s encoded.

23. The apparatus of claim 21 wherein the audio signal s encoded.

24. The apparatus of claim 21 wherein the at least one predetermined threshold is a threshold set comprising at least two thresholds.

25. The apparatus of claim 21 further comprising a total scoring component for assigning a total score to the audio signal indicating a probability that the audio signal comprises a laughter episode.

26. The apparatus of claim 21 further comprising:
   a threshold set adjustment component for determining the at least one predetermined threshold; and
   a performance measurement component for evaluating the at least one threshold.

27. The apparatus of claim 26 further comprising a manual marking component for marking an at least one laughter episode in an audio signal.

28. The apparatus of claim 21 further comprising a quality monitoring component for receiving a laughter episode indication for quality monitoring purposes.

29. The apparatus of claim 28 wherein the monitoring purposes are selected from the group consisting of: agent monitoring; interaction monitoring; product monitoring; sale monitoring, or service monitoring.

30. The apparatus of claim 21 further comprising an interaction analysis component for receiving a laughter episode indication and analyzing an interaction associated with the audio signal.

* * * * *